No. 672,349. Patented Apr. 16, 1901.
P. M. BRAGUNIER.
HITCHING DEVICE.
(Application filed Dec. 4, 1900.)
(No Model.)
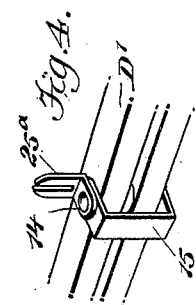
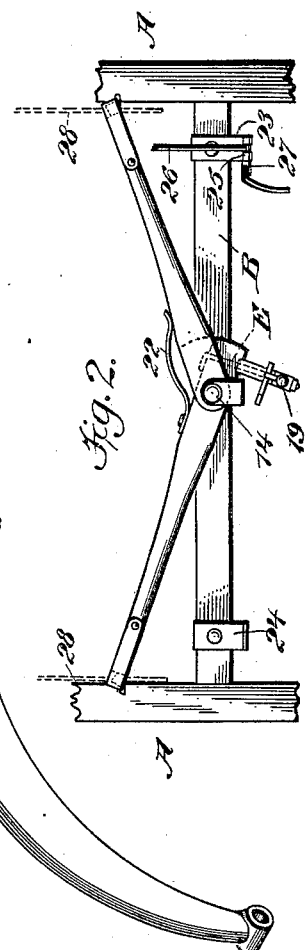
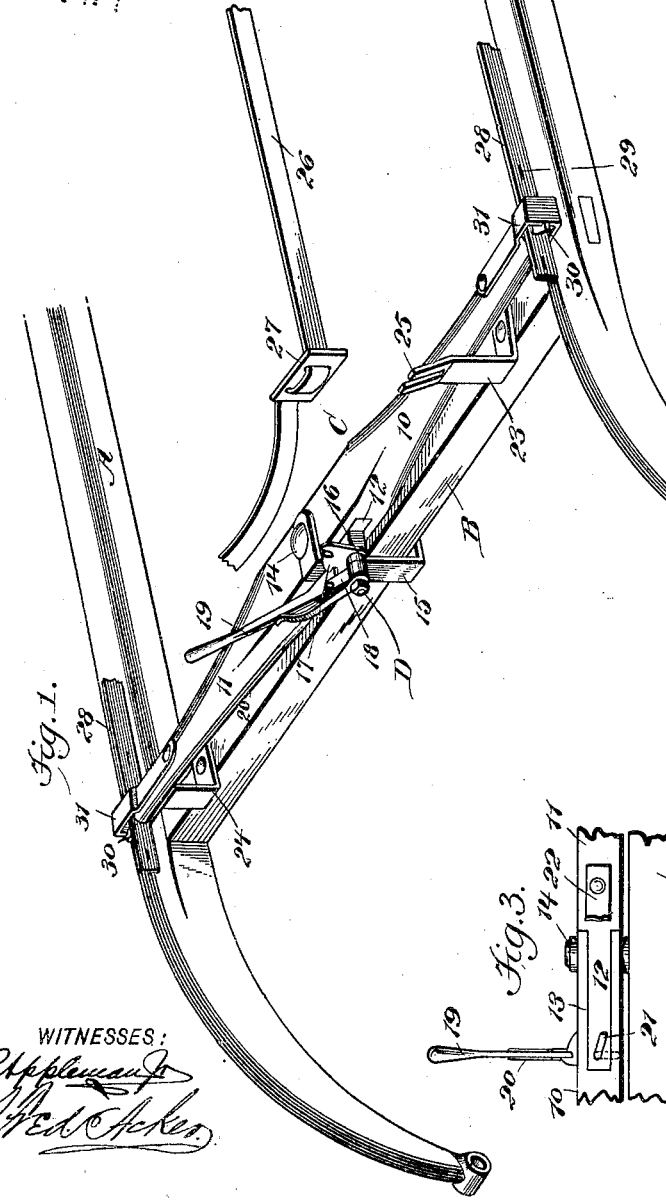
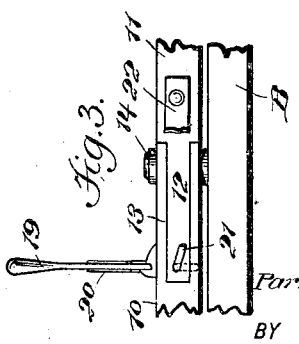
WITNESSES:
INVENTOR
Parker M. Bragunier.
BY
ATTORNEYS

UNITED STATES PATENT OFFICE.

PARKER MADISON BRAGUNIER, OF DENVER, COLORADO.

HITCHING DEVICE.

SPECIFICATION forming part of Letters Patent No. 672,349, dated April 16, 1901.

Application filed December 4, 1900. Serial No. 38,667. (No model.)

*To all whom it may concern:*

Be it known that I, PARKER MADISON BRAGUNIER, a citizen of the United States, and a resident of Denver, in the county of Arapahoe and State of Colorado, have invented a new and Improved Hitching Device, of which the following is a full, clear, and exact description.

One purpose of the invention is to provide a hitching device for the driving-reins of harness adapted for attachment to the cross-bar of vehicle-shafts and to construct the single or double trees in pivotally-connected sections, whereby when a driving-rein is secured to the hitching device and the sections of the single or double tree are free to move forward at their outer ends the traces will be slackened and the draft of the vehicle will be through the medium of the reins, thus tending to check the animal should he endeavor to start or run away.

Another purpose of the invention is to provide a means for locking the sections of the single or double tree end to end and for releasing the said sections, so that they may turn on a suitable pivot.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of shafts having the improvement applied, the singletree on the shafts being illustrated with its sections locked together. Fig. 2 is a plan view of the rear portion of the shafts, illustrating the sections of the singletree as inclining in a forward direction. Fig. 3 is an inner face view of a portion of the cross-bar of the shafts and that portion of the singletree which is pivoted to the said cross-bar; and Fig. 4 is a detail perspective view of a slight modification, illustrating the adaptation of the device to a doubletree.

A represents the shafts of a vehicle, B the cross-bar connecting the said shafts, and C a singletree. This singletree is made in two sections 10 and 11, the section 11 at its inner end being usually provided with a tongue 12, which enters and is adapted to turn in a recess 13 in the corresponding end of the opposing section 10 of the singletree. The singletree is pivoted to the cross-bar B by means of a bolt 14, passed through both sections of the singletree and into the cross-bar B. This pivot-bolt is provided with a suitable guard 15. A sleeve 16 is attached to the tongue 12 of the section 11 of the singletree and extends rearward a necessary distance, and to said sleeve a rack 17 is secured. A shaft D is held to turn in the said sleeve and extends through to the forward portion of the singletree, where the shaft is provided with a head 21 or its equivalent. When the shaft is turned so that the head extends longitudinally of the tongue 12, the sections of the singletree may be swung outward and forward at their outer ends; but the sections of the singletree will be locked end to end when the head 21 is brought to an engagement with both sections of the singletree, as is shown in dotted lines in Fig. 3, at which time the singletree C appears of the ordinary type and is practically as strong.

A lever 19 is pivoted on an extension 18 from the rear portion of the shaft D, and the foot portion of this lever is adapted to enter any one of the notches in the rack 17. Usually the rack is provided with but two notches, so that the lever can be held either in a vertical position or in an inclined position toward the left-hand shaft, as is shown in Fig. 1. When the lever is in the vertical position stated, the head 21 is in the position shown in positive lines, Fig. 3, enabling each section of the singletree to turn on the pivot 14; but when the lever is in the inclined position shown in Fig. 1 the head 21 will lock the two sections of the singletree together. The lever 19 is held in position to engage with the rack 17 by means of a suitable spring 20, and a spring 22, attached to the forward face of one section of the singletree, has bearing against the forward face of the opposing section, as shown in Fig. 2. This spring 22 serves to restore the sections of the singletree to their normal or straight position when the said sections are relieved from tension at their ends.

Two brackets 23 and 24 are secured to the upper face of the cross-bar B, one at each side of the center of the said bar, and these brackets extend up at the rear of the singletree, limiting the rearward movement of the same. The right-hand bracket 23 is provided with a slotted extension 25, and the right-hand driving-rein 26 is passed through the slot of this extension to the rear and is prevented from leaving the said extension by a clamp 27 being adjustably placed on the said rein, as shown in Fig. 1. This clamp 27 is so placed on the rein that when the rein is passed through the extension 25 and the clamp engages with the rear face of the said extension the right-hand driving-rein 26 will be taut or under a slight tension. The driving-rein having been placed in the extension of the bracket 23, the lever 19 is carried to a vertical position, unlocking the sections of the singletree. Thus should a horse attempt to draw the vehicle forward the draft will be directly from the rein 26 and the bracket 23, as the traces 28 will become slackened to a greater or less degree, as the outer ends of the sections of the singletree will be drawn forward, and the singletree will appear as illustrated in Fig. 2.

Preferably the traces 28 are provided with slots 29, and studs 30 on the ends of the singletree are passed through the said slots. The traces are prevented from leaving the studs by placing substantially U-shaped guards 31 at the ends of the singletree, which guards are pivoted to the tree in any suitable or approved manner.

When the team is double, the double tree D' (shown in Fig. 4) is made in sections, and the sections may be controlled in the same manner as has been described with reference to the singletree; but the rein-holder 25ª is in the form of a slotted plate and is located at the pivot 14, and one of both driving-reins are passed through the slot in the said rein-holder, so that both animals will be under control and will pull on the lines from the pivot-point of the doubletree.

Having thus described my invention, I claim as new and desire to secure by Letters Patent—

1. In a hitching device a single or double tree constructed in pivotally-connected sections, a locking device for the sections of the single or double tree, comprising a shaft having a locking-head, a lever attached to said shaft, and a locking device for the lever.

2. In a hitching device, a single or double tree constructed in pivotally-connected sections, a locking device for the sections of the single or double tree, comprising a shaft at one side of the pivotal connection of the sections of the single or double tree, which shaft is carried by one section and is provided with a locking member for engagement with the other section of the single or double tree, a locking-head for the shaft, a lever attached to the said shaft, and a locking device for the lever, substantially as described.

3. In a hitching device, the combination, with a draft-tree, of studs located at the ends of the draft-tree, adapted to receive the traces of a harness, and guards pivoted near the outer ends of the draft-tree, which guards are arranged to extend in loop form over the said studs and the traces when the latter are located on the studs, as described.

In testimony whereof I have signed my name to this specification in the presence of two subscribing witnesses.

PARKER MADISON BRAGUNIER.

Witnesses:
SAMUEL BUTCHER,
PETER KLAUS.